United States Patent
Carver et al.

(10) Patent No.: US 7,221,489 B2
(45) Date of Patent: May 22, 2007

(54) LIVE PRINT SCANNER WITH HOLOGRAPHIC PLATEN

(75) Inventors: John F. Carver, Palm City, FL (US); George W. McClurg, Jensen Beach, FL (US)

(73) Assignee: Cross Match Technologies, Inc, Palm Beach Gardens, FL (US)

( * ) Notice: Subject to any disclaimer, the term of this patent is extended or adjusted under 35 U.S.C. 154(b) by 0 days.

(21) Appl. No.: 11/209,038

(22) Filed: Aug. 23, 2005

(65) Prior Publication Data

US 2006/0039588 A1    Feb. 23, 2006

Related U.S. Application Data

(60) Provisional application No. 60/603,282, filed on Aug. 23, 2004.

(51) Int. Cl.
 *G03H 1/00*    (2006.01)
(52) U.S. Cl. .............................. 359/2; 359/15; 382/124; 382/125
(58) Field of Classification Search .................... 359/1, 359/2, 15; 382/124–127
 See application file for complete search history.

(56) References Cited

U.S. PATENT DOCUMENTS

| | | | |
|---|---|---|---|
| 3,704,949 A | 12/1972 | Thomas et al. | |
| 4,728,186 A | 3/1988 | Eguchi et al. | |
| 5,095,194 A | 3/1992 | Barbanell | |
| 5,138,468 A | 8/1992 | Barbanell | |
| 5,473,144 A | 12/1995 | Mathurin, Jr. | |
| 5,629,764 A | 5/1997 | Bahuguna et al. | |
| 5,732,148 A | 3/1998 | Keagy et al. | |
| 5,737,439 A | 4/1998 | Lapsley et al. | |
| 5,796,858 A | 8/1998 | Zhou et al. | |
| 5,892,599 A | 4/1999 | Bahuguna | |
| 5,986,746 A * | 11/1999 | Metz et al. | ................... 356/71 |
| 6,002,499 A | 12/1999 | Carboline et al. | |
| 6,038,043 A | 3/2000 | Bahuguna et al. | |
| 6,061,463 A | 5/2000 | Metz et al. | |

(Continued)

FOREIGN PATENT DOCUMENTS

WO  WO 03/063065 A1   7/2003

OTHER PUBLICATIONS

Hariharan, P., *Basics of Holography*, University Press, Cambridge, United Kingdom, pp. v-ix, 1-14 and 102-111 (2002).

(Continued)

*Primary Examiner*—Leonidas Boutsikaris
(74) *Attorney, Agent, or Firm*—Sterne, Kessler, Goldstein & Fox P.L.L.C.

(57) ABSTRACT

This invention relates to the use of holographic optical elements in the design and application of biometric scanning instruments used typically for capturing biometric information such as fingerprints and handprints. A live print scanning system for generating a high contrast print image is presented. The system includes a flatbed scanner with a scanning surface and an image sensor, a holographic platen placed on the scanning surface, and a reference beam source that provides a reference beam to the holographic platen. A high contrast print image of a biometric object that is placed on the holographic platen is obtained at the image sensor. A method for generating a high contrast print image is also presented.

3 Claims, 3 Drawing Sheets

U.S. PATENT DOCUMENTS

| | | |
|---|---|---|
| 6,069,969 A | 5/2000 | Keagy et al. |
| 6,111,671 A | 8/2000 | Bahuguna et al. |
| 6,341,028 B1 | 1/2002 | Bahuguna et al. |
| 2003/0086591 A1 | 5/2003 | Simon |

OTHER PUBLICATIONS

Hecht, E., *Optics*, 4th Edition, Addison Wesley, San Francisco, CA, pp. v-vi and 623-639 (2002).

Igaki, S., et al., "Holographic Fingerprint Sensor," *Fujitsu Scientific & Technical Journal*, vol. 25, No. 4, pp. 287-296 (Jan. 1990).

Maltoni, D., et al., *Handbook of Fingerprint Recognition*, Springer Science+Business Media, Inc., New York, NY, pp. v-vii and 1-82 (2003).

Co-pending U.S. Appl. No. 11/208,851, inventors Carver, J., et al., filed Aug. 23, 2005, entitled "Optical Comparator and Method to Compare Biometric Information" (available in the Image File Wrapper in Private PAIR).

Co-pending U.S. Appl. No. 11/209,033, inventors Carver, J., et al., filed Aug. 23, 2005, entitled "Systems and Methods of Capturing Prints with a Holographic Optical Element" (available in the Image File Wrapper in Private PAIR).

Co-pending U.S. Appl. No. 11/209,037, inventors Carver, J., et al., filed Aug. 23, 2005, entitled "Live Print Scanner with Holographic Imaging at Different Magnifications" (available in the Image File Wrapper in Private PAIR).

Co-pending U.S. Appl. No. 11/209,048, inventors Carver, J., et al., filed Aug. 23, 2005, entitled "Live Print Scanner with Active Holographic Platen" (available in the Image File Wrapper in Private PAIR).

\* cited by examiner

LIVE PRINT SCANNER WITH HOLOGRAPHIC PLATEN

CROSS-REFERENCE TO RELATED APPLICATIONS

This application claims benefit to U.S. Provisional Pat. Appl. No. 60/603,282, filed Aug. 23, 2004, the disclosure of which is hereby incorporated by reference herein in its entirety.

BRIEF SUMMARY OF THE INVENTION

This invention relates to the use of holographic optical elements in the design and application of biometric scanning instruments used typically for capturing biometric information such as fingerprints and handprints. Holographic optical elements may be used in place of conventional print scanning elements, such as platens and prisms, to provide the opportunity for print scanning manufacturers to reduce product development cycle times, reduce product cost, size, and weight, and provide optical design flexibility not afforded by common glass and plastic refractive optical elements.

A live print scanning system for generating a high contrast print image is presented. The system includes a flatbed scanner with a scanning surface and an image sensor, a holographic platen placed on the scanning surface, and a reference beam source that provides a reference beam to the holographic platen. A high contrast print image of a biometric object that is placed on the holographic platen is obtained at the image sensor. A method for generating a high contrast print image is also presented.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION OF THE INVENTION

Holographic technologies can be used to realize a number of different devices, such as holographic secure optical keying devices, holographic portable personalized identification devices, non-contact optical doppler biometric scanners, etc. Holographic material is used in biometric scanners, such as live print scanners, to capture biometric data and to provide additional operational features. Holographic material can be any type of holographic material or element, including but not limited to one or more holographic optical elements, holographic diffraction grating(s), holographic filter(s), holographic diffractive optic(s), or combinations thereof. An example holographic optical element may include, but is not limited to, a volume holographic optical element.

Holographic material can be configured to act as one or more optical components, such as a lens and/or mirror, at various angles of input light. In this way, holographic material can shape and direct incident reference beams to capture desired images including print images as described herein. At least one reference beam is required to be used with holographic material. In some applications, output from a coherent light source (such as a laser, for example) is separated into two or more beams for illumination and reference beam purposes. Alternatively, the reference beam may be used to illuminate the object. When holographic material is illuminated by a reference beam, a high contrast print image can be obtained. Typically, a print image will be due to frustrated total internal reflection ("TIR") caused by a reference beam at a platen surface of the holographic material in the presence of print ridges or valleys.

The present invention includes using holographic material as a platen on a scanning surface of a biometric print scanner, such as a biometric fingerprint or handprint scanner, for example. This operational feature of using holographic material as a platen can also be utilized in other types of instruments where platens are required.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

Figure 1:
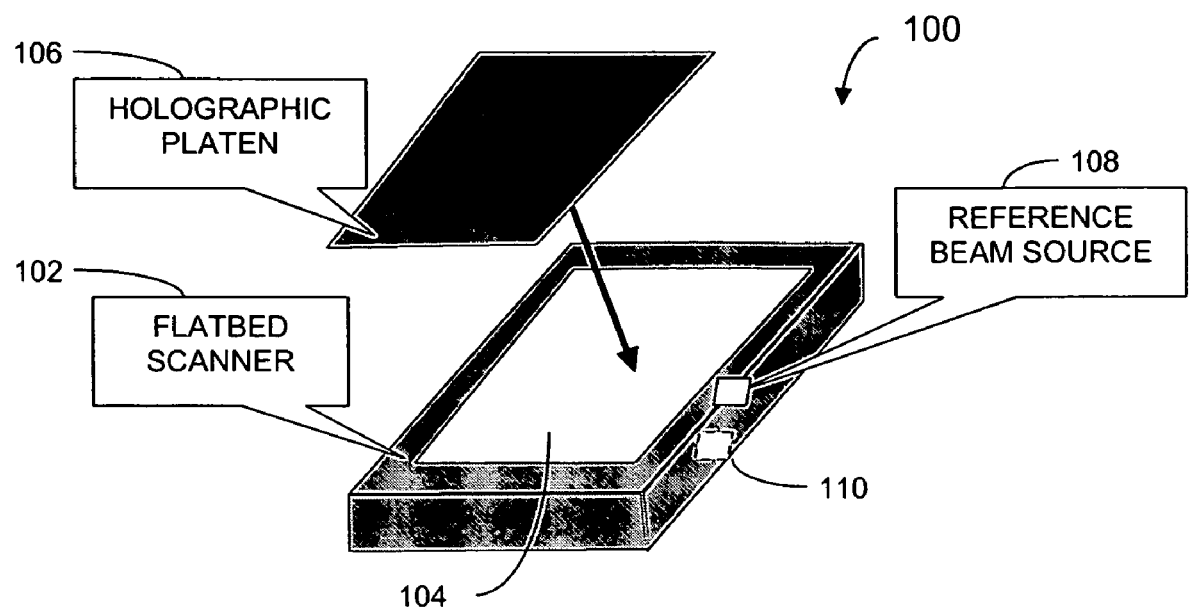
FIGS. 1 and 2 illustrate an example system for using a flat bed scanner with a holographic platen to generate a high contrast print image, according to an embodiment of the present invention.
Figure 2:
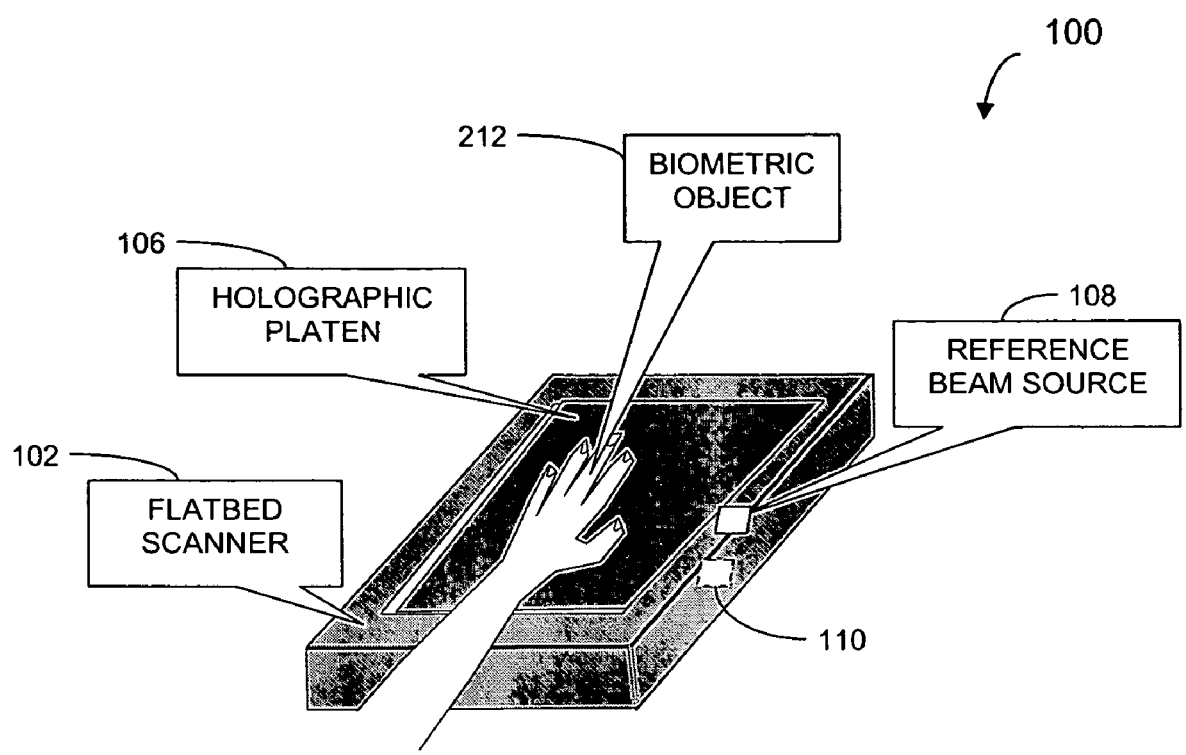

FIGS. 1 and 2 illustrate an example system 100 for using a flatbed scanner 102 along with a holographic platen 106 to generate a high contrast print image, such as a fingerprint or handprint image, for example. System 100 also includes reference beam source 108, which can be controlled to provide a reference beam to holographic platen 106. FIG. 1 shows holographic platen 106 being applied to a scanning surface 104 of flatbed scanner 102. Holographic platen 106 comprises a holographic material having a surface which is a platen, or is at least optically coupled to a platen. A biometric object having a print can then be placed on the platen. The holographic material is configured to shape, focus, and/or direct light. In particular, the holographic material acts to direct light from reference beam source 108 to platen 106 such that total internal reflection occurs. In this way, holographic platen 106 acts as a conventional prism, redirecting the light and generating a print image due to frustrated total internal reflection ("TIR") in the presence of print ridges or valleys.

In a bright-field illumination embodiment, when a finger, for example, is placed in contact with a surface of platen 106, the TIR within platen 106 is broken by ridges of the finger. Thus, light will reflect from areas of platen 106 under valleys of the finger, while light absorbed at ridges of the finger will not be reflected. The contrast between the ridges and valleys of the finger forms an image that can be viewed by a detector or sensor located in flatbed scanner 102. In this embodiment, ridges may appear relatively dark while valleys and background areas may appear relatively bright in the captured print image. Further, the holographic material of holographic platen 106 can optionally act to focus the image onto the sensor. Additional optical elements or optical systems (not shown) can also be added as a further option if additional beam shaping, focusing, magnifying, or directing of the image onto the sensor is desired.

Alternatively, in a dark-field illumination embodiment incident light from holographic material of platen 106 may not be directly imaged by the sensor. In a dark-field illumination embodiment, the finger is directly illuminated, and light entering the print ridges is diffused and reflected back into platen 106 in the areas where the print ridges contact platen 106 and break TIR. The light reflected from the ridges is focused, thereby producing a representative print image. The valleys and background areas may appear relatively dark while ridges may appear relatively bright in the captured print image. Like the bright-field arrangement, holographic material of platen 106 can optionally act to focus the image onto the sensor to capture the image in a dark-field arrangement. Additional optical elements or optical systems (not shown) can also be added as a further option if additional beam shaping, focusing, magnifying, or directing of the image onto the sensor is desired.

As shown in FIG. 2, a biometric object 212, such as a hand or finger, is placed on holographic platen 106 and a scan is made by flatbed scanner 102. During the scan, a reference beam from reference beam source 108 illuminates holographic platen 106 at an appropriate orientation. In this way, a high contrast print image of a print placed on holographic platen 106 is obtained at an image sensor within flatbed scanner 102. Holographic platen 106 can be designed in such a way as to allow a high contrast print image to be obtained with or without a flatbed scanner illumination system 110. A person skilled in the relevant art will recognize that other combinations of custom line scan devices and holographic materials can also be used to generate high contrast print images.

Figure 3:
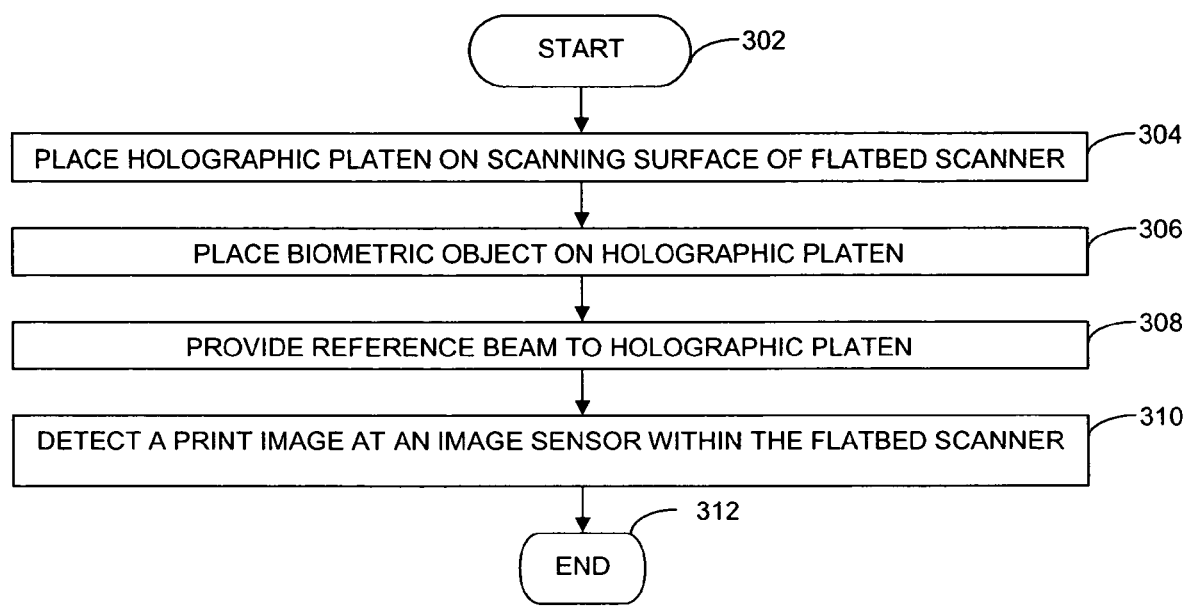
FIG. 3 is a flowchart depicting a method of generating a high contrast print image, according to an embodiment of the present invention.

FIG. 3 is a flowchart depicting a method 300 of generating a high contrast print image, corresponding to an embodiment of the present invention shown in FIGS. 1 and 2. Method 300 begins at step 302 and immediately proceeds to step 304. In step 304, a holographic platen is placed on a scanning surface of a flatbed scanner. In step 306, a biometric object, such as a hand or finger, for example, is placed on the holographic platen. In step 308, a reference beam is provided to the holographic platen. In step 310, an image of the biometric object on the holographic platen is detected at a sensor within the flatbed scanner. Method 300 terminates at step 312.

One advantage of the present invention is that an inexpensive compact device is presented. The sensor and reference beam source can be inexpensive, and the holographic material can be compact.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system for capturing light from a holographic platen, the holographic platen being formed from a holographic element, onto an image sensor in order to generate a print image of a biometric object, comprising:
   a flatbed scanner including a scanning surface that supports the holographic platen and an image sensor; and
   a reference beam source that provides a reference beam to the holographic platen,
   wherein the holographic platen receives the biometric object on a top surface thereof, and
   wherein the reference beam interacts with the biometric object through reflection from the top surface of the holographic platen, such that, when the biometric object is present on the holographic platen, biometric information correlating to the biometric object is formed through frustrated total internal reflection and the holographic platen directs the biometric information onto the image sensor.

2. The system of claim 1, wherein the reference beam source comprises an illumination system within the flatbed scanner.

3. A method for capturing light from a holographic platen, the holographic platen being formed from a holographic element, onto an image sensor in order to generate a print image of a biometric object, comprising:
   receiving the biometric object on a top surface of the holographic platen, the holographic platen being supported by a scanning surface of a flatbed scanner;
   directing a reference beam onto the holographic platen, the reference beam reflecting through the holographic platen to interact with the biometric object, such that, when the biometric object is present on the holographic platen and through frustrated total internal reflection between the reference beam reflecting from the holographic platen, biometric information corresponding to the biometric object is directed onto an image sensor that is coupled to the scanning surface of the flatbed scanner.

\* \* \* \* \*